Sept. 22, 1959     B. S. HERBAGE     2,905,358

RELIEF VALVE

Filed April 29, 1957

Inventor
Bernard S. Herbage
by Howard B. Scheckman
Attorney

United States Patent Office 2,905,358
Patented Sept. 22, 1959

2,905,358

RELIEF VALVE

Bernard S. Herbage, West Allis, Wis., assignor to Allis-Chalmers Manufacturing Company, Milwaukee, Wis.

Application April 29, 1957, Serial No. 655,894

2 Claims. (Cl. 220—89)

This invention relates to a relief valve for a low pressure elastic fluid turbine, and more particularly, to an improved relief valve containing a diaphragm that ruptures when internal pressure within a low pressure turbine housing exceeds a predetermined amount.

Use of a relief valve on a low pressure turbine is old. The purpose of the valve is to provide an emergency outlet for the elastic fluid.

The steam or elastic fluid in a low pressure turbine exhausts to a condenser. Normally the pressure in the low pressure turbine is around 1" of mercury. If something should happen to the condenser, for example if the flow of cooling water should stop, the internal pressure within the low pressure turbine would increase dangerously. The relief valve is provided to prevent injury to machinery or equipment.

A conventional prior art relief valve arrangement employs a hinge member comprising a pintle and leaves, and a rupturable diaphragm. The pintle of the hinge member is supported in a frame that surrounds a relief passage in the low pressure housing. The frame also supports the rupturable diaphragm above the hinge member.

When internal pressure in the turbine is normal, the leaves of the hinge member support the diaphragm against external pressure and the diaphragm closes off the relief passage. When internal pressure in the turbine housing increases a predetermined amount, the internal pressure first ruptures the diaphragm and then forces the leaves of the hinge member to pivot outwardly to open the relief passage.

The thickness of the diaphragm determines at what pressure the relief valve opens. Normally, a diaphragm material is selected which ruptures when internal pressure is approximately five pounds greater than external pressure. Generally, lead foil approximately .015" in thickness is employed.

Although this type of valve is simple and inexpensive, it has four disadvantages:

(1) The outside surface of the diaphragm is exposed. Since the diaphragm is, at most, only several hundredths inches thick, the diaphragm can be injured very easily.

(2) The diaphragm ruptures due to membrane action (i.e. it bursts like a balloon) which depends on the ductile properties of the diaphragm material. The ductile properties of lead diaphragm materials are not consistent, and therefore, the pressure required to rupture the diaphragm cannot be accurately determined.

(3) The hinge member and its support structure presents resistance to the internal flow of steam because it is mounted below the diaphragm inside the relief passage.

(4) It is difficult to inspect the pintle and leaves of the hinge member. The diaphragm covers the hinge member and must be removed. This limits inspection to periods when the turbine is not in operation.

It is an object of my invention to provide a relief valve wherein the pressure required to rupture the diaphragm can be accurately determined.

It is another object of my invention to provide a relief valve that protects the outside surface of the diaphragm yet does not interfere with the egress of steam when the diaphragm ruptures.

It is still another object of my invention to provide a relief valve that has a smooth internal surface that offers less resistance than prior art valves to the internal flow of steam across its internal surface.

It is another object to provide a relief valve that can be sight inspected without removing the diaphragm.

My new relief valve as in a conventional relief valve also utilizes a frame, a diaphragm, and a hinge member. However, the pintle of my hinge member is mounted above the diaphragm outside the relief passage, and each leaf is made up of two plates that clamp the diaphragm between them like a sandwich. The plates cover the surface on both sides of the diaphragm.

In my valve, excess internal pressure forces the leaves outwardly and they shear the diaphragm between the edge of the leaves and the frame member. It is much easier to accurately determine the pressure required to rupture a diaphragm when the diaphragm ruptures in shear.

Some advantages of my new improved relief valve are: (a) more accurate control over the internal pressure in the low pressure turbine, (b) less danger of accidental injury to the surface of the diaphragm, (c) less resistance to internal flow of steam, and (d) easier maintenance of the valve.

Other objects and advantages will appear from the following description considered in conjunction with the attached drawings, in which.

Figure 1:
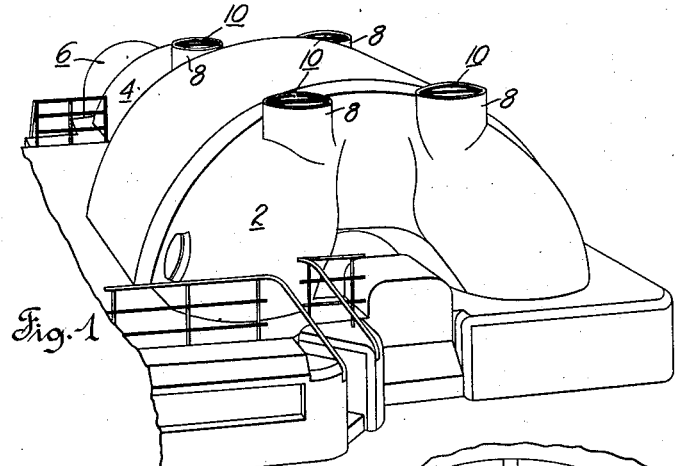
Fig. 1 illustrates placement of relief valves in a low pressure turbine.

Referring to Fig. 1 there is illustrated a low pressure turbine-generator unit which comprises: a low pressure turbine housing 2, generator housing 4, and exciter housing 6.

Relief passages 8 are provided in low pressure housing 2, and relief valves 10 (Figs. 2 and 4) block these passages.

Figure 2:
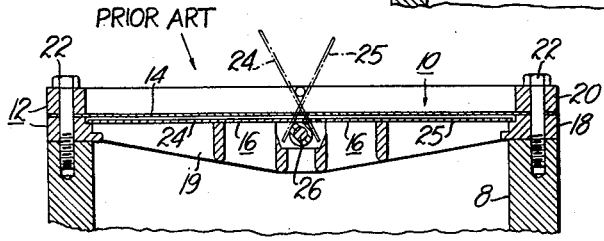
Fig. 2 is a sectional view of a prior art relief valve.

Fig. 2 is a cross section of a prior art relief valve. The prior art relief valve comprises a frame member 12 which supports a rupturable diaphragm 14 and a hinge member 16.

Frame member 12 is annular and split in a horizontal plane forming a lower annular part 18 which contains a grill 19 fixed to and filling its interior, and an upper annular part 20 which is open. Upper and lower parts 18, 20 receive diaphragm 14 between them. Bolts 22 are inserted through upper and lower parts 18, 20 and are threaded into relief passage 8 to clamp the diaphragm.

Hinge member 16 is made up of two semicircular leaves 24, 25 supported by pintle 26. Pintle 26 is carried in lower annular part 18 of frame 12. Grill 19 provided in lower annular part 18 supports leaves 24, 25. Leaves 24, 25 in turn support diaphragm 14 so external pressure will not blow diaphragm 14 inwardly.

When internal pressure within turbine housing 2 approaches external pressure, the pressure between leaves 24, 25 and diaphragm 14 equalizes, and leaves 24, 25 no longer support the diaphragm (as shown in Fig. 2). When internal pressure increases beyond a predetermined amount, the diaphragm blows out. Pressure of the escaping elastic fluid rotates leaves 24, 25 about pintle 26 to the dotted position shown in Fig. 2. The leaves pivot outwardly so they do not interfere with the egress of the elastic fluid from the turbine, and the elastic fluid exits through openings in grill 19.

Figure 3:
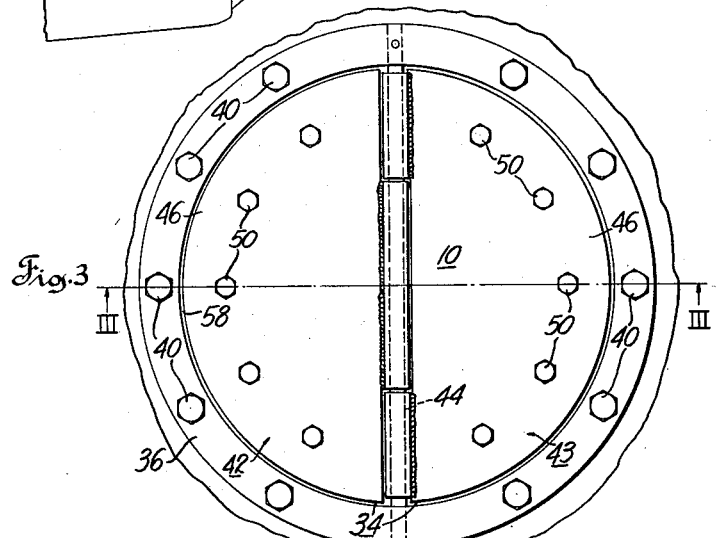
Fig. 3 is a plan view of my new relief valve.
Figure 4:
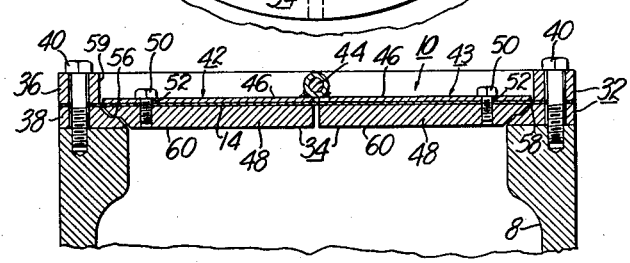
Fig. 4 is a sectional view of Fig. 3 taken in the directions of arrows III—III.

Referring to Figs. 3 and 4 which are plan and sectional views of my new relief valve, its construction and operation will be described.

My new relief valve is similar to the prior art relief valve in that it contains a diaphragm 14, an annular frame member 32 that clamps diaphragm 14 around the periphery of relief passage 8 in housing 2, and a hinge member 34.

My frame member 32, however, differs from prior art frame member 12 in that there is no grill. The frame member is annular and split in a horizontal plane forming upper and lower annular parts 36, 38. Upper part 36 is substantially coextensive with, and supported by, lower part 38. Diaphragm 14 is sandwiched between upper and lower parts 36, 38. Bolts 40 are inserted through upper and lower parts 36, 38 and are threaded into relief passage 8 to clamp diaphragm 14.

Hinge member 34 is made up of two semicircular leaves 42 and 43, and pintle 44. Pintle 44 in my improved relief valve is carried in upper frame part 36 outside relief passage 8. Semicircular leaves 42, 43 are pivotally supported by pintle 44.

Each leaf 42, 43 is made up of an upper and lower plate 46, 48. Diaphragm 14 is sandwiched between upper and lower plates 46, 48 and clamped by clamp means. In the embodiment disclosed the clamp means comprises bolts 50. The bolts extend through openings 52 in upper plates 46, through diaphragm 14, and are threaded into lower plates 48.

Lower annular frame part 38 of frame member 32 is provided with an abutment 56. Abutment 56 supports lower plates 48 and upper plates 46 against external pressure. The abutment limits movement of leaves 42, 43 to an outward direction (as viewed in Fig. 4).

Although leaves 42, 43 cover both surfaces of the diaphragm, there is a selected annular area 58 of diaphragm 14 exposed between the outer circumferential edge of the leaves and the inner surface of the frame member. This is the only area of the diaphragm which can rupture. When internal pressure in the turbine increases, it forces the leaves to pivot upwardly. The outer circumferential edge of lower plates 48, moves relative to inner surface 59 of upper annular part 36 and the diaphragm shears in annular area 58.

Upper plates 46 of leaves 42, 43 serve two functions; they cover the outer surface of the diaphragm so that it fails in shear, and they protect the diaphragm from injury.

Although upper plates 46 of leaves 42, 43 are above the diaphragm, they do not interfere with the egress of the elastic fluid from the relief passage. The pressure pivots the leaves upwardly out of the way after they shear the diaphragm.

Mounting pintle 44 in upper frame part 36 also permits elimination of lower frame part 38, if desired. In which case, the upper portion of relief passage 8 can be shaped like lower frame part 38. The diaphragm in this case would be clamped between upper frame part 36 and relief passage 8.

Mounting pintle 44 in upper frame part 36 above diaphragm 14 provides a valve that has a smooth bottom surface 60 (Fig. 4). Bottom surface 60 presents less resistance to the internal flow of steam across its surface than prior art relief valves.

In addition, this relief valve can be inspected by sight to determine the condition of pintle 44 and plates 46. This is because pintle 44 is now mounted above diaphragm 14, and no longer covered by the diaphragm.

In summary.

Diaphragm 14 is clamped between upper and lower annular frame parts 36, 38 of frame member 32, and plates 46, 48 of leaves 42, 43. An annular portion 58 of diaphragm 14 between the outer circumferential edge of leaves 42, 43 and the inside surface of frame member 32 is exposed. Leaves 42, 43, diaphragm 14 and frame member 32 close off relief passage 8. Diaphragm 14 prevents leaves 42, 43 of hinge member 34 from moving upwardly.

When pressure is normal inside turbine housing 2, external pressure forces leaves 42, 43 against abutment 56 of lower frame part 38. Plates 48 support diaphragm 14 and prevent external pressure from blowing diaphragm 14 inwardly.

If pressure inside turbine housing 2 increases, the pressure urges leaves 42, 43 to pivot about pintle 44 away from abutment 56 toward an exhaust position. Diaphragm 14 resists this attempted movement until the shear strength of the diaphragm is reached. At this point, which corresponds to a predetermined pressure, the pressure forces leaves 42, 43 to pivot upwardly. The leaves shear said diaphragm in the area 58 between the outer circumferential edge of the leaves 42, 43 and inner surface 59 of frame member 32, opening the relief passage.

Restating the advantages of my new relief valve, they are: (1) the pressure required to rupture the diaphragm can be more easily determined because the diaphragm ruptures in shear rather than bursts; (2) the upper portion of the diaphragm is protected by the upper leaf plates and is no longer exposed to injury; (3) the internal surface of the relief valve is smooth, and therefore, there is less resistance to the internal flow of steam; and (4) the hinge can be inspected by sight without removing the diaphragm.

Although this relief valve is disclosed as used in the housing of a low pressure turbine, it is obvious that my valve can be used in any pressure system requiring a relief valve.

From the foregoing it will be apparent to those skilled in the art that the illustrated embodiment of the invention provides a new and improved relief valve, and that various changes and modifications may be made therein without departing from the spirit of the invention or from the scope of the appended claims.

What is claimed is:

1. In a relief valve having an external pressure side and an internal pressure side, the combination comprising: a frame member, said frame member comprising a stack of parts including a lower annular part and an upper annular part, said upper annular part and said lower annular part substantially coextensive, said upper annular part supported by said lower annular part, a rupturable diaphragm to close said relief valve substantially coextensive with said upper and said lower annular parts, said diaphragm sandwiched between said upper annular part and said lower annular part, fastening means for clamping said diaphragm between said upper annular part and said lower annular part, a pintle supported by said upper annular part, said pintle having its ends journaled in said upper annular part, said pintle pivotally supporting two semicircular leaves, each of said leaves including an upper and a lower plate, an abutment provided on said lower annular part, said lower plate of each leaf resting on said abutment when internal pressure within said valve is normal, said plates in turn supporting said diaphragm preventing external pressure from blowing said diaphragm inwardly, means clamping said diaphragm between said upper and lower plates of each leaf, said leaves operative in response to a predetermined excess internal pressure within said valve pivoting about said pintle away from said abutment to shear said diaphragm in an area between the outer edge of said semicircular plates and said frame member.

2. In a relief valve having an external pressure side and an internal pressure side, the combination comprising: a frame member, said frame member comprising a stack of parts including a lower annular part and an upper annular part, said upper annular part and said lower annular part substantially coextensive, said upper annular part supported by said lower annular part, a rupturable diaphragm to close said relief valve substantially coextensive with said upper and said lower annular parts, said diaphragm sandwiched between said upper annular part and said lower annular part, fastening means for clamping said diaphragm between said upper annular part and said lower annular part, a pintle supported by said upper annular part, said pintle having its ends journaled in said upper annular part, said pintle pivotally supporting at least two semicircular leaves including an upper and a lower plate that sandwich said diaphragm between them and cover all but a selected area of said diaphragm between the edge of said plates and said frame member, so said diaphragm can only rupture in shear in said selected area, means clamping said diaphragm between said plates, an abutment provided on said lower annular part, said lower plate of each leaf resting on said abutment when internal pressure within said valve is normal, said plates in turn supporting said diaphragm preventing external pressure from blowing said diaphragm inwardly, said leaves operative in response to a predetermined excess internal pressure within said valve pivoting about said pintle away from said abutment to shear said diaphragm in said selected area.

References Cited in the file of this patent

UNITED STATES PATENTS

| | | |
|---|---|---|
| 1,105,556 | Fouts | July 28, 1914 |
| 2,358,101 | Randall | Sept. 12, 1944 |